United States Patent [19]

Delp

[11] Patent Number: 5,447,354
[45] Date of Patent: Sep. 5, 1995

[54] CHILDREN'S WAGON TOP CONVERSION ASSEMBLY

[76] Inventor: Melvin D. Delp, 158 S. High St., Dublin, Ohio 43017

[21] Appl. No.: 149,968

[22] Filed: Nov. 10, 1993

[51] Int. Cl.⁶ .................................. B62D 25/06
[52] U.S. Cl. ..................... 296/104; 296/180
[58] Field of Search ............ 296/102, 104, 43, 180

[56] References Cited

U.S. PATENT DOCUMENTS

| | | | |
|---|---|---|---|
| 26,547 | 12/1859 | Dikeman | 296/104 |
| D. 188,551 | 8/1960 | Rassier | D21/149 |
| 510,330 | 12/1893 | Davis | 296/104 |
| 741,367 | 10/1903 | Parish | 296/104 |
| 1,319,479 | 10/1919 | Lloyd | 296/110 |
| 1,564,969 | 12/1925 | Lloyd | 296/110 |
| 1,758,112 | 5/1930 | Hewitt | 296/110 |
| 2,262,129 | 11/1941 | Andrews et al. | 296/104 |
| 2,493,833 | 1/1950 | Reynolds | 296/104 X |
| 2,565,746 | 8/1951 | Turner | 296/104 |
| 2,566,572 | 9/1951 | Lindsey | 296/104 X |
| 2,665,165 | 1/1954 | Pitman | 296/102 X |
| 2,774,623 | 12/1956 | Owen | 296/104 |
| 2,820,468 | 1/1958 | Park et al. | 296/102 X |
| 2,942,914 | 6/1960 | Noot | 296/104 X |
| 3,011,824 | 12/1961 | Vassallo et al. | 296/102 |
| 5,186,513 | 2/1993 | Strother | 296/104 X |

FOREIGN PATENT DOCUMENTS

| | | | |
|---|---|---|---|
| 133331 | 6/1949 | Australia | 296/104 |
| 88848 | 7/1920 | Germany | 296/104 |
| 353988 | 6/1961 | Switzerland | 296/180 |
| 163238 | 5/1921 | United Kingdom | 296/104 |
| 439609 | 12/1935 | United Kingdom | 296/104 |

*Primary Examiner*—Joseph Pape
*Attorney, Agent, or Firm*—John R. Flanagan

[57] ABSTRACT

A wagon top conversion assembly includes a framework for extending over and mounting to the opposite sides of a child's wagon, a plurality of mounting brackets attachable to the opposite sides of the wagon for mounting the framework thereto, a flexible cover being mountable over the framework to extend downwardly therefrom with separable side portions and an end portion for attachment to the sides and end of the wagon and capable of being individually placed in rolled-up conditions to open the sides and end of the wagon, and fastening ties attached on the flexible cover for fastening the cover to the sides and end of the wagon and for retaining selected ones of the side portions and end portion of the cover in the rolled-up condition.

18 Claims, 2 Drawing Sheets

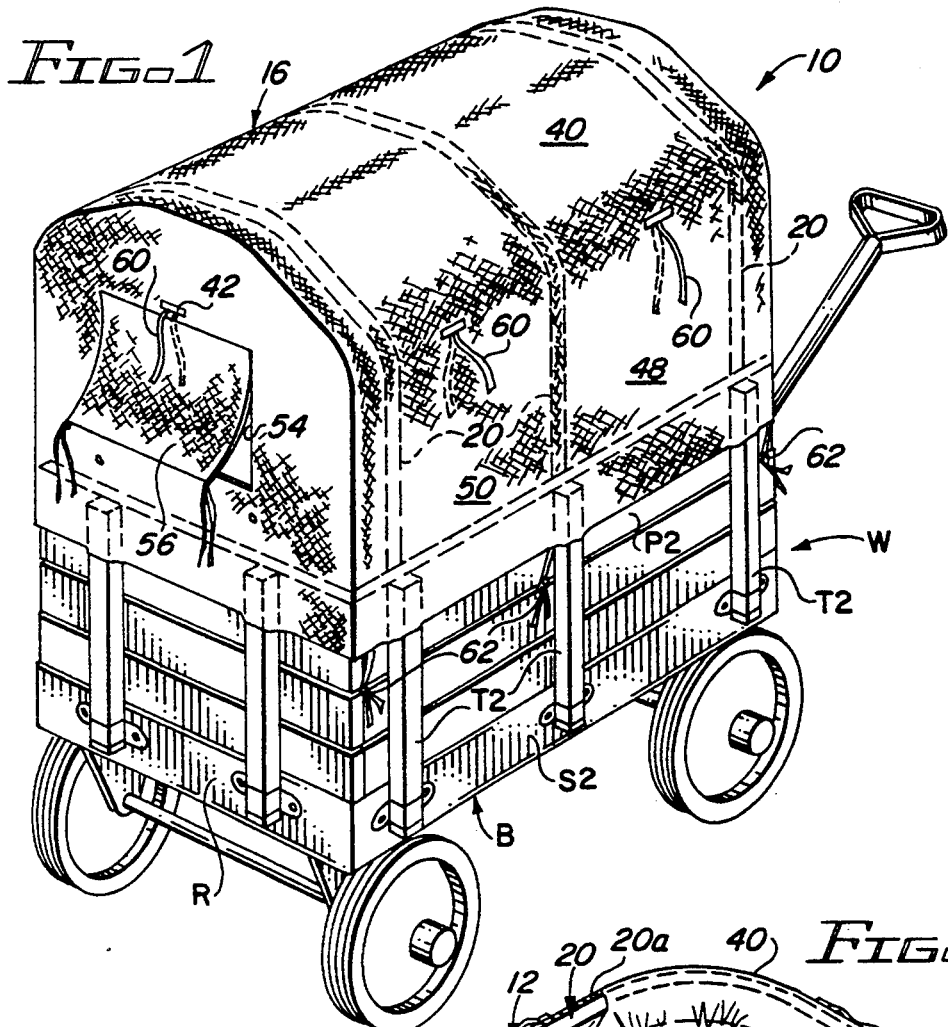
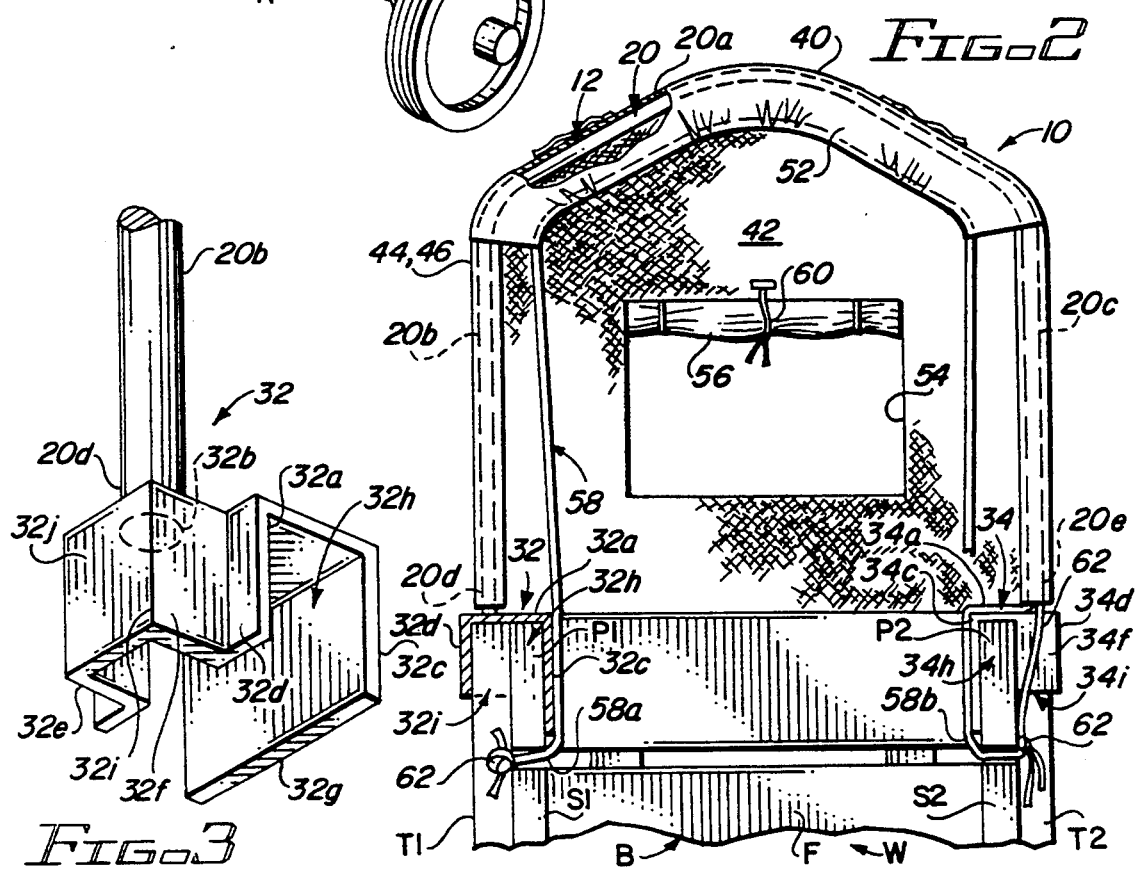

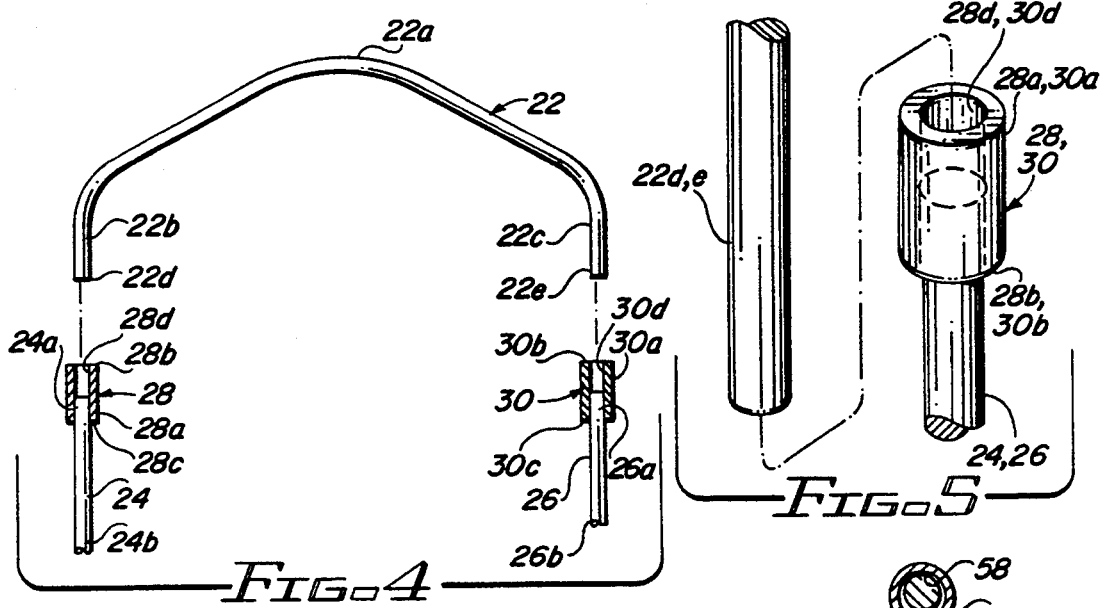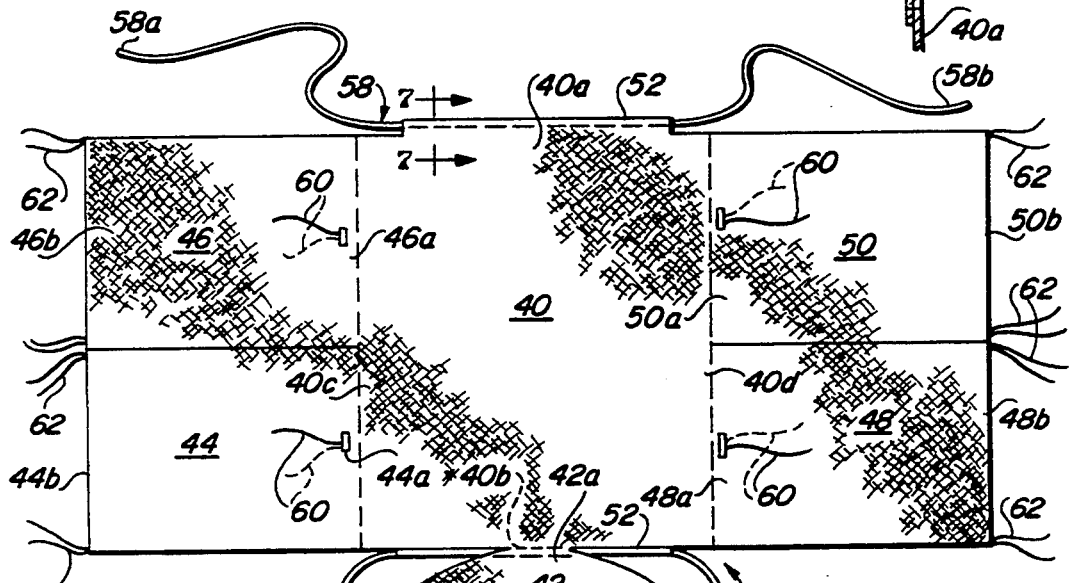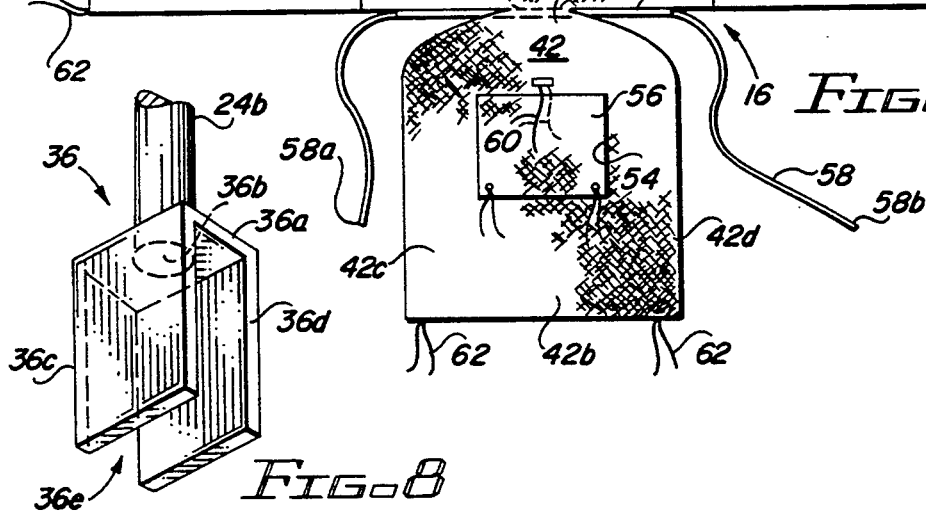

CHILDREN'S WAGON TOP CONVERSION ASSEMBLY

BACKGROUND OF THE INVENTION

1. Field of the Invention

The present invention generally relates to fixtures for children's vehicles and, more particularly, is concerned with a children's wagon top conversion assembly.

2. Description of the Prior Art

Canopies, hoods and similar types of fixtures are provided as a basic component part of bassinets, baby carriages, wagons and similar children's vehicles for protecting a child from the sun, wind and other elements. It is especially important to protect a young infant against the elements. Hence, such factor necessitates the presence of a hood or similar fixture of easy adjustability attached to a child's vehicle so as to accord with a variety of climatic conditions.

A variety of such fixtures have been proposed over the years to meet such needs. Representative examples of such fixtures are disclosed in U.S. patents to Lloyd (U.S. Pat. Nos. 1,319,479 and 1,564,969), Hewitt (U.S. Pat. No. 1,758,112) and Rassier (U.S. Pat. Des. No. 188,551).

The two Lloyd fixtures and the Hewitt fixture are each adjustable hoods, being affixed in a permanent manner to opposite sides of a baby carriage by fasteners extending therebetween. The Rassier fixture includes a framework having a fabric cover mounted thereover, being attached to opposite sides of a child's "frontier-type" wagon.

Each of the above-described hood fixtures is designed to be permanent component parts of the accompanying vehicle. The Lloyd and Hewitt fixture designs are not particularly suitable for use on a typical child's wooden wagon. The Rassier fixture design provides a cover feature having inadequate ventilation means for differing climatic conditions. The particular cover, being a unitary length of fabric, provides no feature for permitting one or more portions of the cover to be opened separately for regulating air flow therethrough. Additionally, the Rassier fixture is designed for use with a particular wagon design, rather than for use with a variety of children's wooden wagons.

Consequently, a need exists for a cover or hood fixture for a wagon being simple in design and construction for inexpensive manufacture and ease in installation by the average person. The cover or hood fixture should be adapted as well for easy removability from the wagon by being separable into different parts.

SUMMARY OF THE INVENTION

The present invention provides a children's wagon top conversion assembly designed to satisfy the aforementioned needs by avoiding the drawbacks of the prior art without introducing other drawbacks. Instead, the wagon top conversion assembly of the present invention provides expanded capabilities not available in the prior art cover or hood fixtures.

One capability is the simplicity in design and construction of the wagon top conversion assembly for inexpensive manufacture thereof and for ease in the installation thereof by the average person. A second capability is the adaptability of the wagon top conversion assembly for installation on a variety of children's wooden wagons. A third capability is the easy removability of the wagon top conversion assembly from the wagon. A fourth capability is the separability feature of side panels of the cover such that one or more side panels may be individually fastened to opened or closed positions. Such feature provides greater adaptability of the cover to particular climatic conditions and permits greater viewing range as well for one or more children riding in the wagon.

Accordingly, the present invention is directed to a wagon top conversion assembly which comprises: (a) a framework for extending over and mounting to the opposite sides of a child's wagon; (b) mounting means attached to the opposite sides of the wagon for mounting the framework thereto; (c) a flexible cover being mountable over the framework and extending downwardly therefrom with separable side and end portions for attachment to the sides and end of the wagon; and (d) fastening means disposed on the flexible cover for fastening the cover to the sides of the wagon.

In a first embodiment, the framework is formed by a plurality of inverted generally U-shaped rods. Each inverted U-shaped rod is a continuous cylindrical shaft extending between a pair of opposite ends and is made of a resilient material. In a second embodiment, the framework is formed by a plurality of upper support rods having arch-like configurations and being attached by connecting means to a plurality of pairs of lower support rods. Each upper support rod has a middle section tapered upwardly and extending between a pair of downwardly extending end portions to a pair of opposite ends. Each lower support rod is a straight cylindrical shaft extending between a pair of opposite ends. The connecting means are annular sleeves having passageways therethrough. Each upper support rod and pair of lower support rods are inserted into opposite ends of a pair of the annular sleeves to provide the connection and mounting of the upper support rod with the pair of lower support rods.

The mounting means of the assembly for mounting the framework to the opposite sides of the wagon are a plurality of pairs of mounting brackets being attached symmetrically to opposite sides of the wagon at spaced locations therealong. In a first embodiment, each mounting bracket has a flat top portion and first and second pairs of opposite side portions attached to respective pairs of opposite edges of the top portion and extending substantially perpendicularly downwardly therefrom. Each inverted U-shaped rod of the framework is rigidly attached at its opposite lower ends to respective top portions of the mounting brackets. One side portion of the first pair thereof is spaced from the other opposite side portion thereof and from the second pair of opposite side portions so as to define a first channel extending therebetween. The opposite side portion of the first pair thereof extends outwardly from the opposite inner lateral edges of the side portions of the second pair thereof. The side portions of the second pair define a second channel which intersects and communications with the first channel of the mounting bracket.

Each mounting bracket of the first embodiment is mounted to a side of the wagon at a location wherein the side boards forming the wagon side are connected together by a vertical support post extending and attached perpendicularly thereto. Each such mounting bracket is removably, but tightly frictionally, fitted over an upper side board and adjacent support post of the wagon side such that a top portion of the upper side board and a top portion of the support post are respectively received into the first channel and the second channel of the mounting bracket.

In a second embodiment, each mounting bracket includes a flat top portion and a pair of opposite side portions connected to a pair of opposite edges of the top portion and extending perpendicularly downwardly from the top portion so as to define a channel extending between the opposite side portions and beneath the top portion. Each lower support rod of the framework is rigidly attached to the top portion of one of the mounting brackets. Each mounting bracket of the second embodiment is removably, but tightly frictionally, fitted over the upper side board of each opposite side of the wagon such that the top portion of the upper side board is received into the channel defined between the opposite side portions of the mounting bracket.

The flexible cover of the assembly includes a top panel, an end panel and first and second pairs of opposite side panels. The top, end and side panels are made of a flexible material. The top panel has a sleeve defined along both front and rear edge thereof. The end panel of the cover extends between an upwardly tapered top edge, a straight bottom edge and a pair of opposite straight side edges. The end panel is connected along a portion of the top edge to the rear edge of the top panel. The end panel has a window defined through a central portion thereof and a closure flap, being substantially identical in size with the window, attached to a portion of the end panel above and adjacent to the window. The closure flap is movable between opened and closed positions relative to the window. The first and second pairs of side panels of the cover are attached at respective upper ends thereof to the opposite side edges of the top panel and extend downwardly therefrom to the opposite sides of the wagon. Each side panel of the first and second pairs thereof are identical in size with one another.

The plurality of fastening means of the assembly include a pair of tie-down cords and a plurality of pairs of releasable fastening ties. The tie-down cords, each being of substantial length, extend through the respective sleeves defined on the front and rear edges of the top panel of the flexible cover. The tie-down cords are then attached, such as by tying a knot, at the opposite ends thereof around a respective upper side board of the opposite sides of the wagon.

Each releasable fastening tie of a pair thereof is attached, such as by stitching, at one end to selected locations on the flexible cover. The fastening tie at the other end is free for releasably fastening with the free end of the other tie of the pair thereof. A pair of such ties are attached at the opposite lower ends of the end panel and of each individual side panel. A further pair of such ties are each attached on the opposed surfaces of each side panel along the top edge thereof. Additional pairs of such ties are attached on the end panel and closure flap.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective view of a wagon top conversion assembly of the present invention, being shown mounted to the sides of a child's wagon.

FIG. 2 is an enlarged front view of the wagon top conversion assembly of FIG. 1, showing a first embodiment of a framework of the assembly mounted to the opposite sides of the wagon and extending over the wagon box and a flexible cover of the assembly mounted over the framework and attached by tie-down cords to the opposite sides of the wagon.

FIG. 3 is an enlarged perspective view of a first embodiment of one of the mounting brackets of the wagon top conversion assembly of FIG. 2.

FIG. 4 is a front, partly exploded, view of a second embodiment of the framework of the assembly, showing an upper arch-shaped support rod being attachable at opposite lower ends by a pair of annular connectors to a pair of lower support rods.

FIG. 5 is an enlarged fragmentary, partly exploded, view of the framework of FIG. 4.

FIG. 6 is a top plan view of the flexible cover of the assembly, showing the tie-down cords extending through sleeves defined on front and rear edges of the cover and a plurality of pairs of releasable fastening ties attached at spaced locations on the cover.

FIG. 7 is an enlarged cross-sectional view of the tie-down cord extending through the front sleeve defined on the flexible cover taken along line 7—7 of FIG. 6.

FIG. 8 is an enlarged perspective view of a second embodiment of one of the mounting brackets of the wagon top conversion assembly.

DETAILED DESCRIPTION OF THE INVENTION

Referring to the drawings, and particularly to FIGS. 1 and 2, there is illustrated a wagon top conversion assembly of the present invention, generally designated 10. A typical wagon W upon which the assembly 10 can be used has a box B made up of a pair of opposite lateral sides S1, S2 extending between a front side F and a rear side R thereof. Each lateral side S1, S2 of the wagon box B is formed by a plurality of boards P placed adjacent to one another lengthwise and being connected together by a plurality of support posts T1, T2 attached perpendicularly thereto at spaced locations along the lateral sides S1, $2 and front and rear sides F, R of the wagon box B.

In its basic components, the wagon top conversion assembly 10 includes a framework 12 for extending over a box B of a child's wagon W, mounting means for mounting the framework 12 to the box B of the wagon W, a flexible cover 16 mountable over the framework 12 and having a plurality of fastening means disposed thereon for securement of the cover 16 over the framework 12 and to the opposite sides S1, S2 of the wagon box B.

Referring particularly to FIGS. 1 and 2, in a first embodiment the framework 12 is formed by a plurality of separate inverted generally U-shaped rods 20, preferably three in number. The inverted U-shaped rods 20 have a symmetrical arch-like configuration and are mounted by the mounting means to the opposite sides S1, S2 of the box B of the wagon W in a fore-and-aft spaced relation from one another. Each inverted U-shaped rod 20 is in the form of a continuous cylindrical shaft having a middle portion 20a which tapers upwardly and extends between a pair of opposite generally straight side portions 20b, 20c which, in turn, extend downwardly to a pair of opposite lower ends 20d, 20e.

Referring particularly to FIGS. 4 and 5, in a second embodiment the framework 12 is formed by a plurality of upper support rods 22 and a plurality of pairs of lower support rods 24, 26 with the pairs of lower support rods 24, 26 being attached to the respective upper support rods 22 by a plurality of pairs of connectors 28, 30. Preferably, the framework 12 is formed by three upper support rods 22, six lower support rods 24, 26 and six connectors 28, 30, being provided in three sets. Only one set of these components formed by one upper support rod 22, two lower support rods 24, 26 and two connectors 28, 30 are shown in FIG. 4.

Each of the upper support rods 22 is identical in size and has an arch-like configuration. Each upper support rod 22 is in the form of a continous cylindrical shaft having a middle portion 22a tapered upwardly and extending between a pair of opposite end portions 22b, 22c which, in turn, extend downwardly to a pair of opposite lower ends 22d, 22e.

Each lower support rod 24, 26 of the plurality of pairs thereof is identical in size and has a generally straight configuration. Each lower support rod 24, 26 is in the form of a continuous generally straight shaft extending between a pair of opposite upper and lower ends 24a, 24b and 26a, 26b.

Each connector 28, 30 of the plurality of pairs thereof is identical in size and has a generally straight configuration. Each connector 28, 30 is in the form of an annular sleeve 28, 30 having an endless cylindrical sidewall 28a, 30a extending between a pair of opposite upper and lower open ends 28b, 30b and 28c, 30c, thereby defining a central passageway 28d, 30d through the sleeve 28, 30. At their opposite upper and lower ends 28b, 30b and 28c, 30c, each pair of the annular connectors 28, 30 receives in frictional fitting relation with the endless sidewalls 28a, 30a thereof and in the central passageways 28d, 30d thereof the respective lower ends 22d, 22e of one of the upper support rods 22 and the respective upper ends 24a, 26a of a pair of the lower support rods 24, 26 such that pairs of the respective ends abut within the annular connectors 28, 30. By such attachment arrangement, the plurality of upper support rods 22 are firmly connected with the plurality of pairs of lower support rods 24, 26 for forming the second embodiment of the framework 12.

Referring particularly to FIGS. 2 and 3, there is shown a first embodiment of the mounting means in the form of a plurality of pairs of mounting brackets 32, 34 (only one pair being shown in FIG. 2) for mounting on the tops of opposite sides S1, S2 of the box B of the wagon W. As can be observed in FIG. 2, the mounting brackets 32 (only one shown) mounted on the top of one opposite side S1 are oriented as a mirror image of the mounting brackets 34 (only one shown) mounted on the top of the other opposite side S2 of the wagon box B. Each mounting bracket 32 of the plurality of pairs thereof in the first embodiment is identical in size and configuration. Consequently, each mounting bracket 34 has components the same as those of the one mounting bracket 32 shown in FIG. 3.

Referring to FIG. 3, in the first embodiment the mounting bracket 32 has a flat top portion 32a of rectangular configuration upon which at 32b is rigidly attached the lower end 20d of the inverted U-shaped support rod 20. The mounting bracket 32 also has first and second pairs of opposite side portions 32c, 32d and 32e, 32f connected to and extending perpendicularly downwardly from the pairs of opposite sides and ends of the flat top portion 32a. The first and second pairs of opposite side portions 32c, 32d and 32e, 32f are disposed perpendicularly to one another. The one side portion 32c is spaced from the opposite side portion 32d so as to define a first channel 32h extending therebetween. The opposite side portion 32d of the first pair thereof is attached along opposite inner lateral edges of the opposite side portion 32e, 32f of the second pair. A second channel 32i is defined extending between the second pair of opposite side portions 32e, 32f. The second channel 32i also extends to and intersects and communicates with the first channel 32h. An end portion 32j extends between opposite outer lateral edges of the opposite side portions 32e, 32f of the second pair so as to close the outer end of the second channel 32i.

Referring again to FIGS. 2 and 3, in the first embodiment the mounting brackets 32, 34 fit snugly over the portions of the tops of the respective opposite lateral sides S1, S2 of the wagon box B at the spaced locations thereon between the front and rear sides F, R of the wagon box B which locations include the tops of the support posts T1, T2. Top portions of the uppermost side board P1, P2 are received through the first channels 32h, 34h of the mounting brackets 32, 34, while top portions of the respective adjacent support posts T1, T2 are received in the second channels 32i, 34i of the mounting brackets 32, 34. The one side portions 32c, 34c of the first pairs thereof of the respective mounting brackets 32, 34 rests adjacent to and abuts the inner surfaces of the respective upper side boards P1, P2. The opposite side portion 32d, 34d and the second pair of opposite side portions 32e, 32f and 34e, 34f of the respective mounting brackets 32, 34 rest adjacent to and abut the outer side edges of the respective support posts T1, T2, as seen in FIG. 2. The mounting bracket 32, 34 provide a removably, but tight frictionally, fitted relationship with the upper side boards P1, P2 and support posts T1, T2.

Referring particularly to FIG. 8, there is shown a second embodiment of the mounting means in the form of a pair of mounting brackets 36 (only one of which is shown). Each mounting bracket 36 includes a flat top portion 36a having a rectangular configuration and upon which at 36b is rigidly attached the lower end 24b, 26b of one of the lower support rods 24, 26 of the framework 12. Each mounting bracket 36 also includes a pair of opposite side portions 36c, 36d connected to a pair of opposite edges of the top portion 36a and extending perpendicularly downwardly from the top portion 36a so as to define a channel 36e extending between the opposite side portions 36c, 36d and beneath the top portion 36a thereof.

Each mounting bracket 36 of the second embodiment thereof inserts over a top portion of the uppermost side board P1, P2 of each opposite side S1, S2 of the wagon box B such that such top portion of the upper side board P1, P2 is received through the channel 36e defined between the opposite side portions 36c, 36d of the mounting bracket 36. Each mounting bracket 36 is provided in a removably, but tight frictionally, fitted relationship with a respective one of the upper side boards P1, P2 of the wagon box B.

Referring now to FIGS. 1, 2 and 6, the flexible cover 16 of the assembly 10 includes a top panel 40, an end panel 42 and first and second pairs of opposite side panels 44, 46 and 48, 50. The top, end and side panels 40–50 have rectangular configurations and are integrally connected together. The top panel 40 extends between pairs of opposite front and rear edges 40a, 40b and of opposite side edges 40c, 40d. As best seen in FIGS. 2 and 6, the top panel 40 has a tubular sleeve 52 defined along each of the front and rear edges 40a, 40b thereof.

The end panel 42 of the cover 16 extends between an upwardly tapered top edge 42a, a straight bottom edge 42b and a pair of opposite straight side edges 42c, 42d. The end panel 42 is connected along a portion of the top edge 42a to the rear edge 40b of the top panel 40. The end panel 42 has a window 54 defined through a central portion thereof and a closure flap 56, being about identical in size with the window 54, integrally attached to a portion of the end panel 42 above and adjacent to the window 54. The closure flap 56 is movable between opened and closed positions relative to the window 54.

The first and second pairs of side panels 44, 46 and 48, 50 of the cover 16 are attached at respective upper ends 44a, 46a and 48a, 50a thereof to the opposite side edges 40c, 40d of the top panel 40 and extend downwardly therefrom to lower ends 44b, 46b and 48b, 50b disposed adjacent to the opposite sides S1, S2 of the wagon W. Each side panel 44–50 of the first and second pairs thereof are identical in size with one another.

Referring again to FIGS. 1, 2 and 6, the plurality of fastening means 18 of the assembly 10 include a pair of elongated flexible tie-down cords 58 and a plurality of pairs of upper and lower releasable flexible fastening ties 60, 62. The tie-down cords 58, each being of substantial length, have opposite ends 58a, 58b and extend through the respective tubular sleeves 52 defined on the front and rear edges 40a, 40b of the top panel 40 of the flexible cover 16. The tie-down cords 58 are then attached, such as by tying knots 64 at each of the opposite ends 58a, 58b thereof around a respective upper side board P1, P2 of the opposite sides S1, S2 of the wagon W.

Each releasable fastening tie 60, 62 of the respective upper and lower pairs thereof has a pair of opposite ends and is attached, such as by stitching, at one end to selected locations on the flexible cover 16. The fastening tie 60, 62 at the other end is free for releasably fastening with the free end of the other tie 60, 62 of the pair thereof. The lower pairs of ties 62 are attached at the opposite lower ends 42b–50b of the end panel 42 and of each individual side panel 44–50. The upper pairs of ties 60 are attached on the side panels 44–50 along the top edges 44a–50a thereof. One string of each of the ties 60 is disposed inside of the respective panel, while the other string is disposed outside of the panel to facilitate use of the ties in encircling the rolled-up panel.

By such disposition the flexible cover may be attached to the opposite sides S1, S2 and to the rear side R of the wagon W in the following manner. The lower pairs of ties 62 attached on the end panel 42 are extended around the upper board P3 of the rear side R and are releasably tied together. The lower pairs of ties 62 attached on each side panel 44–50 are similarly extended around the upper side board P1, P2 of each opposite side S1, S2 of the Wagon W and are releasably tied together.

Each side panel 44–50 may be individually moved to an opened position by rolling up the respective panel 44–50 and releasably fastening together the respective upper pair of ties 60 attached on the top edge thereof.

Also, the closure flap 56 attached above the window 54 defined in the end panel 42 may be rolled up by fastening together the upper pair of ties 60 disposed on the top edge of the closure flap 56.

A suitable material from which the components of the framework 12 and the mounting brackets 14 can be fabricated are a plastic material or a metal, such as aluminum. The flexible cover 16 preferably is made of a durable washable material, such as canvas.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A wagon top conversion assembly, comprising:
    (a) a framework for extending over and mounting to opposite sides of a child's wagon;
    (b) a plurality of mounting means attachable to the opposite sides of the wagon for mounting said framework thereto;
    (c) a flexible cover being mountable over the framework and extending downwardly therefrom, said cover capable of being placed in a rolled-up condition to open the wagon at the sides and end thereof; and
    (d) fastening means attached on said flexible cover for attaching said cover to the sides and end of the wagon and for retaining said cover in the rolled-up condition;
    (e) said mounting means including a plurality of pairs of mounting brackets being mounted at spaced locations along opposite sides of the wagon, each of said mounting brackets including a flat top portion and first and second pairs of opposite side portions attached to respective pairs of opposite edges of the top portion and extending substantially perpendicularly downwardly therefrom.

2. The assembly of claim 1 wherein said framework includes a plurality of inverted generally U-shaped rods having spaced opposite ends.

3. The assembly of claim 2 wherein said opposite ends of each of said inverted U-shaped rods are attached upon said top portions of said of mounting brackets of each of said respective pairs thereof.

4. The assembly of claim 1 wherein said framework includes:
    a plurality of upper support rods having arch-like configurations;
    a plurality of pairs of lower support rods having generally straight configurations; and
    a plurality of pairs of connectors, each pair of connectors being adapted to receive and connect with lower ends of one of said upper support rods and upper ends of one pair of said lower support rods.

5. The assembly of claim 4 wherein each of said lower support rods has a lower end being attached upon said top portion of one of said mounting brackets of each of said respective pairs thereof.

6. The assembly of claim 4 wherein each of said upper support rods has a middle section tapered upwardly and a pair of end portions attached at opposite ends of said middle section and extending downwardly therefrom.

7. The assembly of claim 1 wherein one of said side portions of said first pair thereof is spaced from the other of said side portion thereof so as to define a first channel extending therebetween for mounting said mounting bracket over one of the sides of the wagon.

8. The assembly of claim 7 wherein said side portions of said second pair define a second channel extending to and intersecting with said first channel of said mounting bracket for mounting said mounting bracket over a top portion of a vertical support post on one of the sides of the wagon.

9. The assembly of claim 1 wherein each of said mounting brackets also includes a channel defined and extending between said opposite side portions of said each mounting bracket and beneath said top portion thereof for mounting said mounting bracket over a top portion of one of the sides of the wagon.

10. The assembly of claim 1 wherein said flexible cover includes:
   a top panel;
   an end panel; and
   first and second pairs of opposite side panels, said top, end and side panels being connected together and capable of being separately placed in rolled-up conditions.

11. The assembly of claim 10 wherein said end panel has a window defined therethrough.

12. The assembly of claim 11 further comprising:
   a closure flap attached to a portion of said end panel above and adjacent to said window, said closure flap being movable between opened and closed positions relative to said window.

13. The assembly of claim 1 wherein said cover has a sleeve defined along front and rear edges thereof.

14. The assembly of claim 13 wherein said said fastening means includes an elongated flexible tie-down cord extended through said sleeve along each of said front and rear edges of said cover and being adapted to be secured at opposite ends of said cords to the sides of the wagon.

15. The assembly of claim 1 wherein said fastening means includes a plurality of pairs of releasable flexible fastening ties.

16. The assembly of claim 15 wherein said pairs of ties are attached in spaced relation from one another along opposite lower ends of said cover and along upper side portions thereof.

17. A wagon top conversion assembly, comprising:
   (a) a framework for extending over and mounting to opposite sides of a child's wagon, said framework including a plurality of inverted U-shaped support members;
   (b) a plurality of pairs of mounting brackets mountable over top portions of opposite sides of the wagon at spaced locations along opposite sides of the wagon, each of said mounting brackets of said pairs thereof including a flat top portion and first and second pairs of opposite side portions attached to respective pairs of opposite edges of the top portion and extending substantially perpendicularly downwardly therefrom, said support members having lower ends attached upon said top portions of said pairs of mounting brackets so as to mount said framework over the wagon;
   (c) a flexible cover mounted over said framework and extending downwardly therefrom, said cover having separable side panels and an end panel for attachment to the sides and an end of the wagon and capable of being placed in a rolled-up condition to open the wagon at the sides and end thereof; and
   (d) a plurality of pairs of flexible fastening ties attached on said flexible cover and being adapted for attaching said cover to the sides and end of the wagon and for retaining selected ones of said side panels and said end panel of said cover in the rolled-up condition.

18. The assembly of claim 17 wherein said end panel has a window defined therethrough and a closure flap is attached to a portion of said end panel above and adjacent to said window, said closure flap being movable between opened and closed positions relative to said window.

* * * * *